United States Patent Office 3,125,976
Patented Mar. 24, 1964

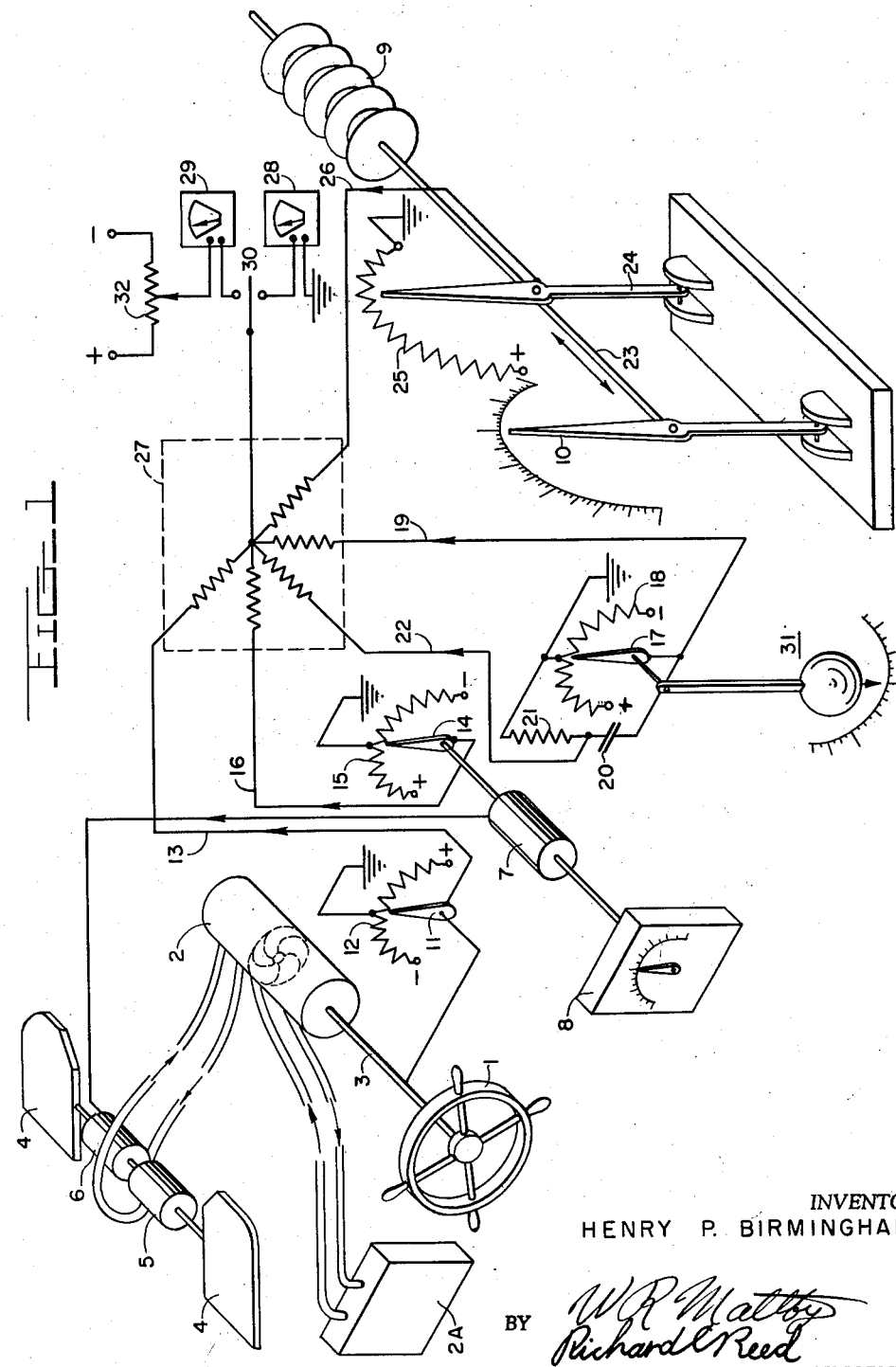

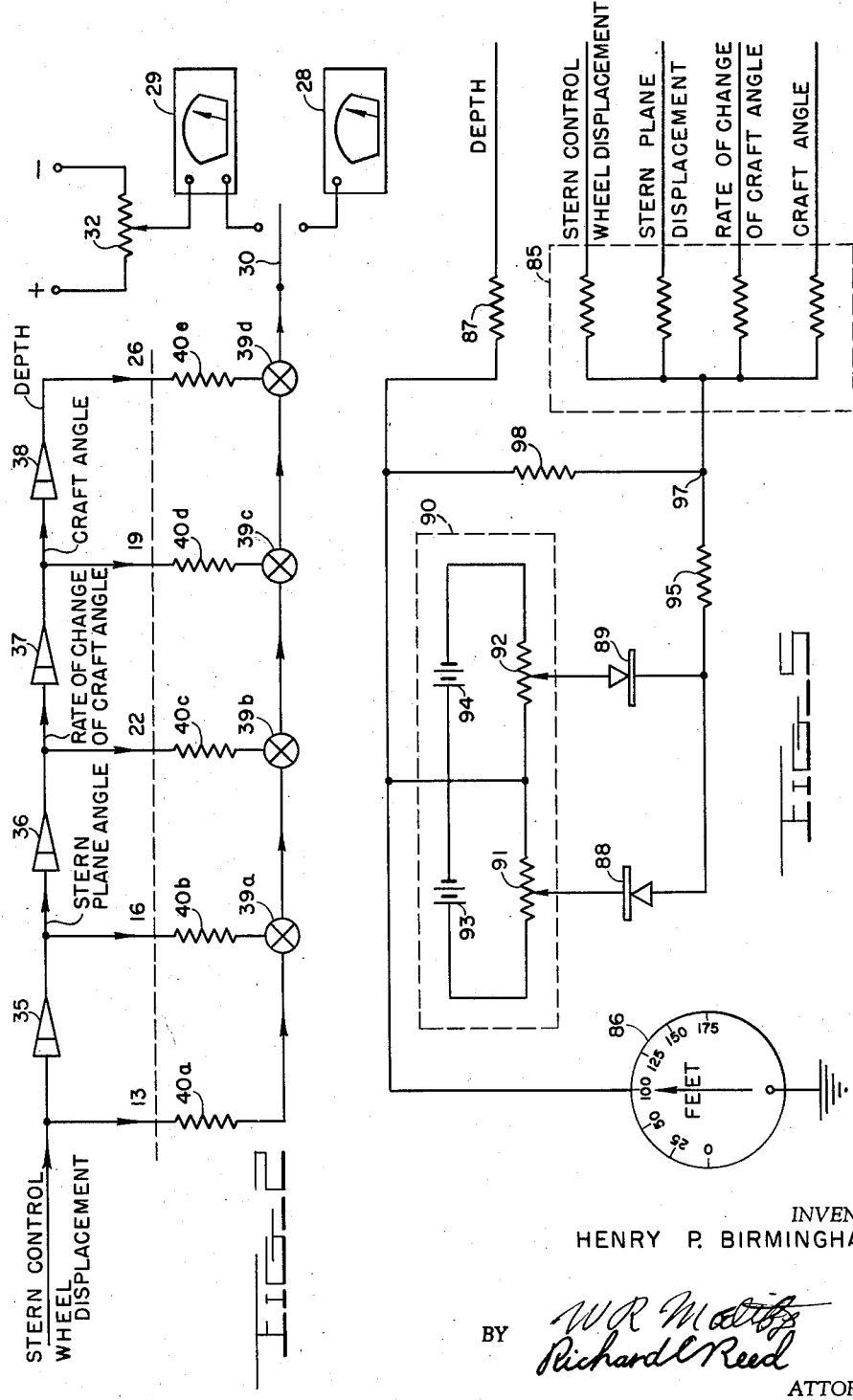

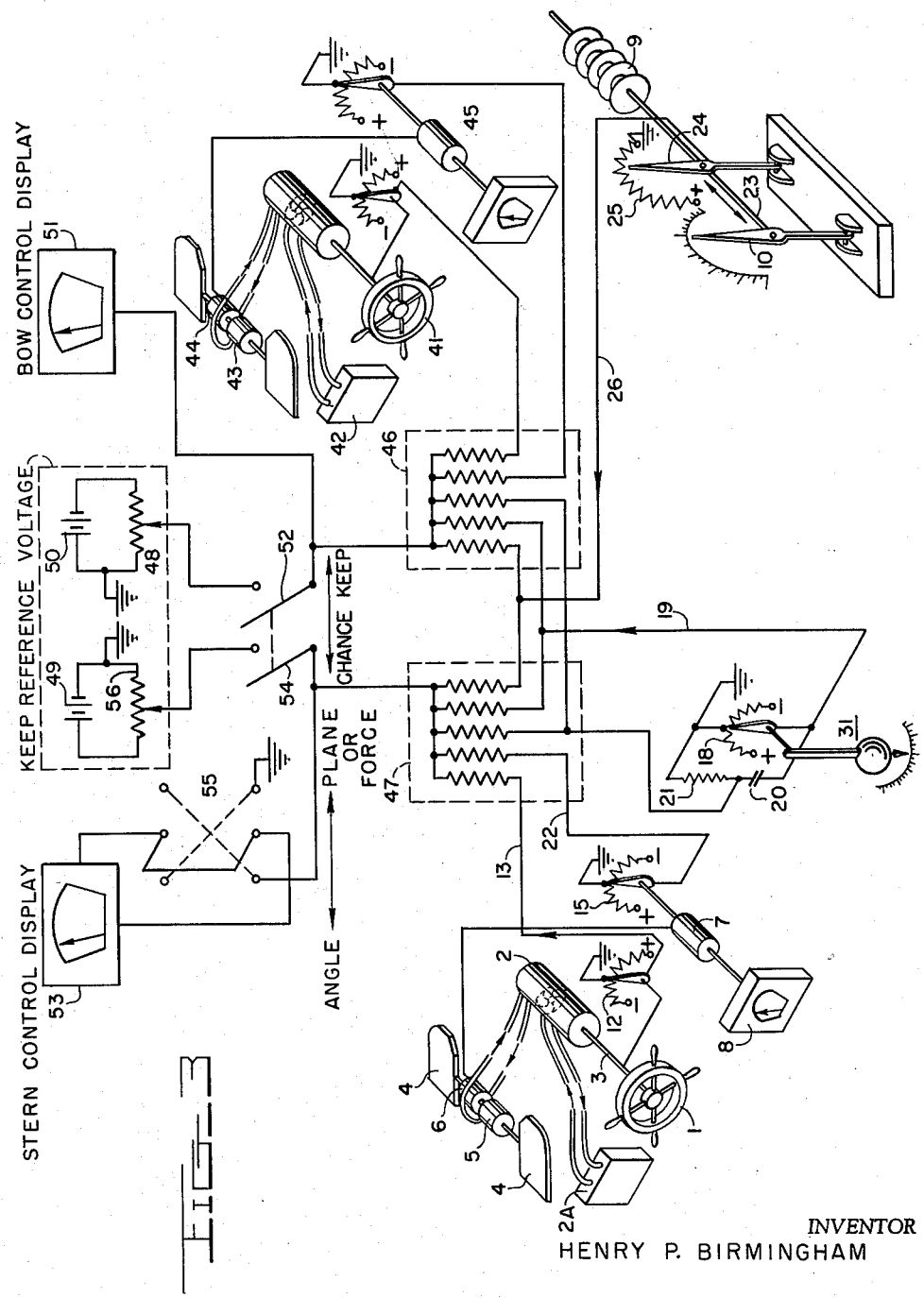

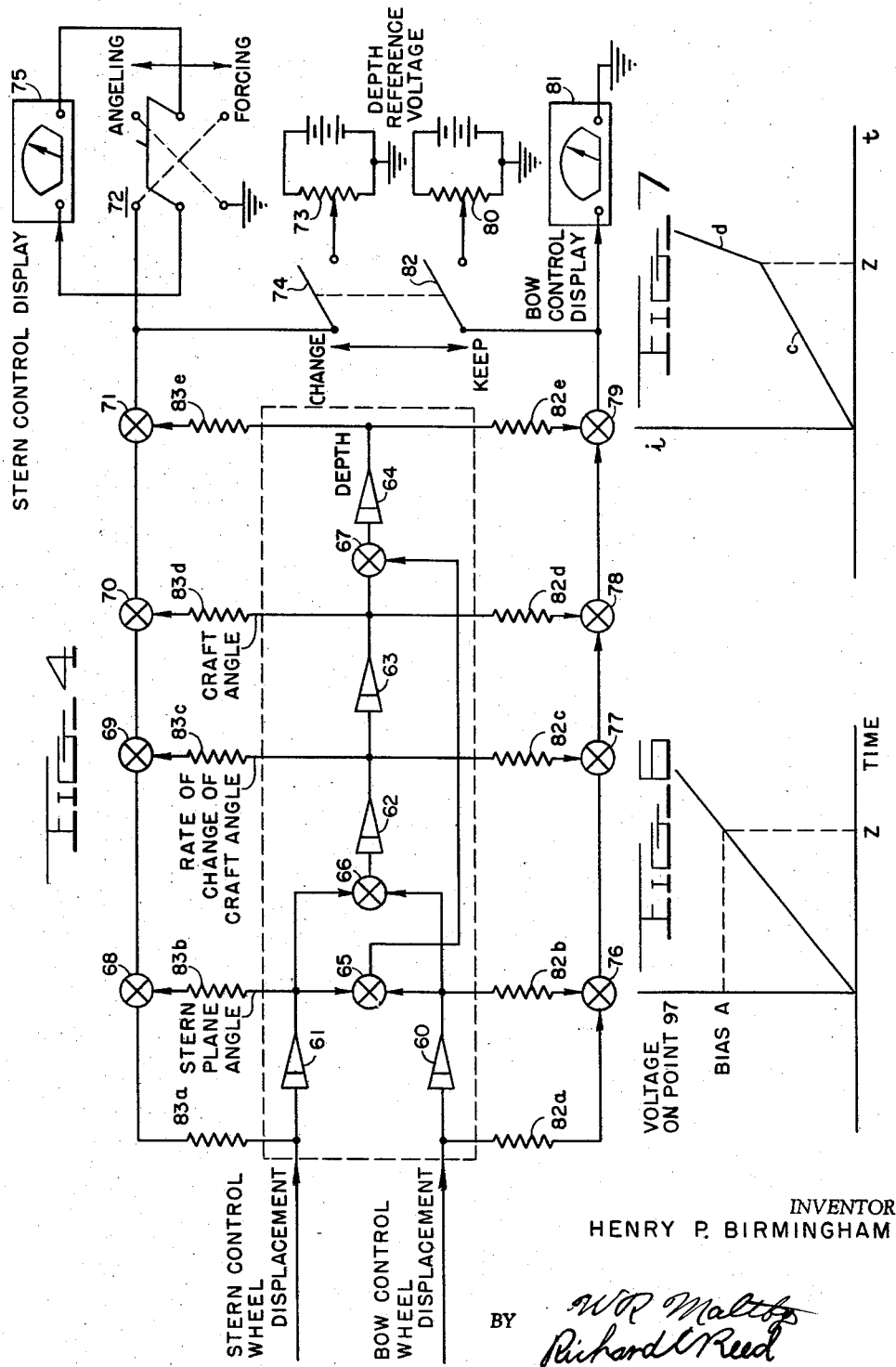

3,125,976
MOBILE UNIT CONTROL SYSTEM
Henry P. Birmingham, 2505 Branch Ave. SE.,
Washington 20, D.C.
Filed June 6, 1957, Ser. No. 664,144
15 Claims. (Cl. 114—23)
(Granted under Title 35, U.S. Code (1952), sec. 266)

The invention described herein may be manufactured and used by or for the Government of the United States of America for governmental purposes without the payment of any royalties thereon or therefor.

The invention relates in general to an electrical indicating system and in particular to an electrical mobile unit control system.

In the control of a mobile unit, the navigator at present is required to make accurate and immediate evaluations of the future effects of his acts on the movement of the mobile unit. This is an exceedingly difficult task with existing mobile unit control devices, and usually requires a long period of intensive training.

In controlling a submarine, for example, three instrument displays are frequently used for depth changing purposes. These instruments provide an indication of (1) stern plane angle (the angle of the stern planes measured from the center line of the craft), (2) the craft angle (the angle of the center line of the craft measured from a horizontal plane), and (3) craft depth. The planesman, or operator, is required to watch the three displays simultaneously and immediately evaluate the future effect on craft depth of the present movement of the stern planes. This is an extremely difficult task for the experienced planesman and nearly an impossible one for the novice. Past experience has shown that experienced planesmen often "overshoot" or are required to "hunt" to obtain a desired depth, which can be dangerous to the submarine and its personnel.

In the past, attempts to alleviate the hazards involved have pursued a course of more and more extensive training. It is indicative that this approach has not proven satisfactory, that submarine commanders remain extremely conservative in issuing orders for change in depth. For example, diving control officers are frequently instructed never to exceed five or ten degrees of craft angle, and many commanders order changes in depth in much smaller increments. Even so, due to the problem of gauging the future consequences of present acts on the movement of the submarine, an experienced planesman is unable to bring the craft to a predetermined level in a smooth glide but, at best, must oscillate about a desired course.

The depth keeping operation of a submarine is one in which it is necessary to maintain a constant depth, such as in snorkel operation. Because of the tendency toward instability and the effect of sea turbulence, this is an extremely difficult task with existing equipment. Again, the impracticability of simultaneously observing three instruments while attempting to make time and anticipatory judgments results in the submarine "hunting" and "overshooting" the desired depth.

In a few limited instances, it has been attempted to utilize a fully automatic system. These systems, however, are extremely complex and, therefore, are always susceptible to breakdown and require continual and costly maintenance.

Accordingly, it is an object of the present invention to provide a simple electrical navigational monitoring device which gives the operator immediate information on control motions that are optional for obtaining the desired depth in a smooth dive.

Another object of the present invention is to provide a mobile unit device which eliminates the necessity of making time and anticipatory judgments when changing depth or attempting to maintain depth.

Another object of the present invention is to eliminate the necessity for an operator to watch and correlate a plurality of instrument readings during a depth changing or depth keeping operation by reducing the operation to a simple "tracking" task.

Another object of the present invention is to provide a simple electrical control device for taking a craft to a desired depth at a desired angle.

Another object of the present invention is to provide a single instrument display to aid a planesman in arriving at, or maintaining, a desired depth without "overshooting" or "hunting."

Another object of the present invention is to provide a craft control device in which a plurality of signals representative of the variables of craft operation are combined and the resultant signal controls a single indicating device.

Other objects and many of the attendant advantages of this invention will be readily appreciated as the same becomes better understood by reference to the following detailed description when considered in connection with the accompanying drawings, in which like reference numerals designate like parts throughout the figures thereof and wherein:

FIG. 1 is a schematic view and wiring diagram showing a first embodiment of the present invention.

FIG. 2 is a flow chart of the first embodiment of the present invention shown in FIG. 1.

FIG. 3 is a schematic view and wiring diagram showing a second embodiment of the present invention.

FIG. 4 is a flow chart of the second embodiment of the present invention shown in FIG. 3.

FIG. 5 shows an embodiment of a control circuit that may be used with the first embodiment of the present invention shown in FIG. 1.

FIG. 6 shows the voltage-time characteristic of a voltage applied to the designated point in the control circuit shown in FIG. 5.

FIG. 7 shows the current-time characteristic of the output of the control circuit shown in FIG. 5.

In the present invention, a system for controlling a mobile unit is provided which eliminates the need for the operator to make time and anticipatory judgments in the operation of the mobile unit. The system gives the operator command signals at the display for making optional control movements for efficiently acquiring an intended position of the mobile unit. This is accomplished by deriving signals that are correlates of the variable of mobile unit operation, combining the signals to obtain a resultant signal, and employing the resultant signal to control a single indicating device.

In one embodiment of the present invention, as applied to the control of a submarine, signals representing (1) stern plane control wheel displacement, (2) stern plane angle, (3) rate of change of craft angle, (4) craft angle and (5) depth of the craft are produced through the use of appropriate transducers. These signals are then combined to obtain a resultant signal which is then utilized to control a single indicating device.

The terms "stern plane angle" and "craft angle" are defined above. If the various embodiments of the present invention are employed in the operation of a mobile unit the "mobile unit angle" may be defined as either the angle of the center line of the mobile unit measured from a horizontal plane or the angle of the center line of the mobile unit measured from a vertical plane, depending upon whether the direction of movement of the mobile unit is in a vertical or horizontal plane, respectively.

Referring to FIG. 1, a first embodiment of the present invention is disclosed showing a mobile unit control device control that may be employed by a single planesman to control a submarine during the depth changing or keeping operations. It will be noted that the stern plane control wheel 1 is connected to a hydraulic motor 2 by means of shaft 3. Displacement of the stern plane control wheel 1 opens a valve schematically shown as a dotted outline in the hydraulic motor. The size of the opening and the direction of displacement of control wheel 1 determines the direction and rate of flow of fluid from pump and reservoir 2A through hydraulic motor 2, hydraulic repeater 5, and back to the pump and reservoir. The flow of fluid through hydraulic repeater 5 produces a rate movement of stern planes 4 in the desired direction. Since selsyn system 6 is mechanically coupled to stern planes 4 and hydraulic repeater 5 and electrically coupled to selsyn repeater 7, the movement of the stern planes 4 is reproduced at the plane angle display meter 8 by means of selsyn system 6 and selsyn repeater 7. Translational movement of the craft through the fluid gives rise to a force against offset stern planes 4 thereby causing the craft angle to change. The change in craft angle is determined by use of pendulum 31 which maintains a vertical position while the associated scale assumes an angular relationship relative to the pendulum which is indicative of craft angle. A signal that is dependent upon the relative change in position between pendulum 31 and associated scale is obtained from the pick-off on potentiometer 18 to provide a signal indicative of change in craft angle. The change in depth, which results from a change in craft angle, is resolved by use of pressure sensing mechanism 9 and depth indicator 10. A signal is obtained that is indicative of depth by means of the pick-off on potentiometer 25. Likewise, a signal that is dependent on stern plane control wheel displacement is derived from a pick-off on potentiometer 12 and a signal dependent on stern plane angle is derived from a pick-off on potentiometer 15. It is, of course, understood that the type of instrumentation used to measure craft angle, depth, stern plane control wheel displacement, and stern plane angle may take any number of conventional forms and that the signals derived in dependency upon these variables may be secured through a variety of conventional transducers. For example, Remote Compass Transmitter Type 15013, Bendix Exlipse Pioneer, which is a conventional magnetic compass, may be used instead of pendulum 31 and potentiometer 18 to provide a signal dependent upon the angle between the center line of a mobile unit and a vertical plane through magnetic north pole. After being amplified and rectified by suitable means, the signal provided by the magnetic compass may be applied across resistor 20 and capacitor 21 shown in FIG. 1.

Referring again to FIG. 1, it is noted that the contact arm 11 of potentiometer 12 is coupled to shaft 3. As stern plane control wheel 1 is displaced to rotated stern planes 4 through hydraulic motor 2 and hydraulic repeater 5 a voltage proportional to the direction and amount of displacement of stern plane control wheel 1 will appear on lead 13. Clockwise displacement of the stern plane control wheel results in a positive voltage on lead 13 while, simultaneously, the stern planes 4 begin to rotate counter-clockwise; and counter-clockwise displacement of the stern plane control wheel 1 will result in a negative voltage on lead 13 and a clockwise rotation of the stern planes. The rotation of stern planes 4 acts through selsyn system 6 and selsyn repeater 7 to provide a corresponding indication on meter display 8 and a corresponding rotation of contact arm 14 of potentiometer 15. The direction and amount of rotation of stern planes 4 determines the polarity and amount of the voltage appearing on lead 16.

As stated above due to the translational movement of the craft in the fluid, the movement of stern planes 4 will be effective in developing a desired craft angle which develops as a result of the summation of the forces acting against the stern planes 4. Counter-clockwise movement of stern planes 4 causes an increasing clockwise craft angle, while clockwise movement of the stern planes results in a counter-clockwise craft angle.

Examination of the polarity of the voltages applied to potentiometer 18 will show that a clockwise craft angle results in a positive voltage on lead 19, while a counter-clockwise craft angle causes a negative voltage. The output signal from contact arm 17 is also fed into an R-C network comprising resistance 21 and capacitance 20. This circuit is utilized as a conventional differentiator. The voltage across resistance 21 appears on lead 22 and is proportional to the rate of change of craft angle. This differentiation could be performed in any of several other well known manners as for example by using a mechanical differentiation device. Or, if desired, the rate of change of craft angle could be derived directly by the use of a conventional rate gyro.

As stated above an indication of depth can be obtained, in one manner, through the use of a pressure sensitive mechanism 9 and indicator 10. As the pressure sensing mechanism 9 acts through shaft 23 to rotate indicator arm 10 and control arm 24 about their respective pivots, a voltage proportional to depth will appear on lead 26. Since one end of potentiometer 25 is at ground potential and the indicator arm 24 is at this point at sea level, any downward movement of the vessel results in a positive voltage on lead 26. The magnitude of the voltage is proportional to the downward movement or depth of the craft.

The representative voltages appearing on all the leads are algebraically added by means of adding network 27 to provide a resultant signal which, depending upon the position of switch 30, is applied to display meter 28 or display meter 29. Display meter 28 is calibrated in feet and display meter 29 is a null-indicating device. These combined signals, in the case of meter 28, vary as a function of craft behavior and command the operator to make appropriate control motions while keeping the meter reading of the intended depth. As to display meter 29, variable resistor 32 is calibrated in feet and provides a voltage that is applied to the display meter equal in magnitude to a voltage obtained from the pick-off on potentiometer 25 when the craft is level and at the desired depth. The voltage, representing actual depth derived from the pick-off on potentiometer 25, is opposite in polarity to the voltage produced by variable resistor 32 when the actual depth is less than the desired depth, and the operator, to bring the craft to the desired depth, manipulates stern plane control wheel 1 so that appropriate voltages are supplied to adding network 27 to maintain the output of the adding network equal in magnitude and opposite in polarity to the voltage supplied by variable resistor 32 to display meter 29. If, on the other hand, the actual depth is greater than the desired depth, the voltage derived from the pick-off on potentiometer 25 is of the same polarity as that supplied by variable resistor 32. To bring the craft to the desired depth the operator manipulates stern plane control wheel 1 so that appropriate voltages are provide to adding network 27 to maintain the output of the adding network equal in magnitude and opposite in polarity to the voltage supplied by variable resistor 32 to display meter 29. Thus, the operator may position variable resistor 32 to produce a voltage representing desired depth and, through stern plane control wheel 1, produce voltages at the adding network which null out the desired depth voltage until that depth is attained.

To summarize, for an increase in depth the stern plane control wheel 1 is turned in a clockwise direction; this results in an initial positive voltage on lead 13 and an initial counter-clockwise rotation of stern plane 4. This counter-clockwise rotation results in turn in a positive voltage on lead 16 and because of the translational movement of the craft causes an increasing clockwise craft angle; the increasing angle on the craft is reflected as a positive voltage on lead 19 and a voltage on lead 22 which is equivalent to the rate of change of craft angle. And, the increasing clockwise angle on the craft results in a "dive" or increasing depth which in turn appears as a positive voltage on lead 26. The combined voltages, in the case of meter 28 place the display needle at the intended depth reading and require the operator to make a counter-clockwise movement of control wheel 1 to maintain the needle at the desired depth marker and the craft at the desired angle. Increasing depth, however, causes meter 28 to read a higher current and requires a counter-clockwise rotation of control to initiate a pullout. This counter-clockwise rotation of control wheel 1 results in the controls and instruments all functioning in a manner directly reverse to that set forth above and with gradual cessation of these control inputs the vessel ceases its descend and levels out at the intended depth.

In order to understand the operation of the embodiment of the present invention shown in FIG. 1, it is necessary to appreciate that in the operation of a submarine any displacement of the stern plane control wheel will initiate a change in the angle of the stern planes which in turn results, because of the transitional movement of the vessel through the fluid, in a corresponding change in craft angle and a subsequent change in craft depth. It can be shown that the response of a submarine may be likened to a series of integrals, that is, the angle of the stern plane is in effect the first integral of the stern plane control wheel displacement, the rate of change of the craft angle is substantially the second integral, craft angle the third integral, and the craft depth the fourth integral of the stern plane control wheel displacement.

Now referring to the flow chart of FIG. 2 along with the schematic of FIG. 1, the relationship between the various hydrodynamic characteristics of the vessel will be considered in greater detail. A displacement of the stern plane control wheel 1 opens a hydraulic valve, the size of the opening depending upon the amount of stern plane control wheel 1 displacement. The size of the opening in turn controls the flow of hydraulic fluid through motor 2 and therefore the rate of movement of the stern planes 4. The direction of displacement of stern plane control wheel 1 determines the direction of flow of the hydraulic fluid and thus the direction of movement of stern planes 4. The planesman thus has a direct control over the rate of change of stern plane angle, since direction and rate of plane change are determined by the direction and amount of stern plane control wheel displacement. This is referred to generally as rate control and mathematically the process by which this is accomplished is integration. Therefore, a stern plane angle is the first time integral of stern plane control displacement.

The relation between stern plane angle and craft angle is somewhat more complex. Rotation of the stern planes from the normal horizontal position results in an angular force on the craft, due to its forward movement and the fluid acting against the offset stern planes. Were it not for the damping effect of the water on angular rotation of the craft, angular acceleration would be proportional to this applied force and therefore approximately proportional to plane angle. Actually the relationship between the applied force acting at the stern and stern plane angle cannot be represented by a straight line. However, within the limits of rotation generally imposed on stern plane movement—i.e., stern plane rotation rarely exceeds 25 degrees in either direction—the angular force can be considered proportional to the plane angle and hence angular acceleration is likewise proportional to plane angle. These approximations are acceptable since any errors created by them are negligible and do not seriously affect the functioning of the instant embodiment. Therefore, if angular acceleration is approximately proportional to the plane angle, mathematically the rate of change of craft angle is approximately the first time integral of stern plane angle and craft angle is approximately the second time integral of stern plane angle. For purposes of the present invention, the damping effect of the water can also be considered negligible and thus be ignored.

Depth is a function of direction of movement, speed and time. Direction of movement and angle on the craft do not perfectly correspond, due to the hydrodynamic effect known as "angle of attack." However, for purposes of the present invention, their correspondence can be accepted as a close approximation without introducing more than a negligible error. Therefore, craft angle directly determine rate change of depth and is, in effect, nothing more than the slope of the depth vs. time curve. Hence, the craft angle is the first derivative of depth with respect to time and, inversely, depth is the time integral of craft angle.

Referring to FIG. 2, the part of the figure above the dotted line represents the hydrodynamic response of the submarine while the part below refers to the signals obtained from the hydrodynamic response. The process of integration is represented by integrators 35 to 38. Thus, stern plane control wheel displacement is integrated by integrator 35 to obtain the stern plane angle, the stern plane angle is integrated by integrator 36 to obtain the rate of change of craft angle which is integrated by integrator 37 to obtain craft angle, and the craft angle in turn is integrated by integrator 38 to obtain depth. The resulting representative voltages appear on leads 13, 16, 19, 22 and 26 and are combined by adding networks 39a to 39d to energize display meter 28 or null-indicator display meter 29 depending upon the position of switch 30. Resistors 40a to 40e are representative of the resistors in adding network 27 shown in FIG. 1. In employing the embodiment of the present invention shown in FIG. 1, to change depth, after switch 30 is placed in the lower position shown in FIG. 2, it is only necessary that the planesman or operator initially displace the stern plane control wheel 1 so that the pointer of display meter 28 indicates the desired depth. This displacement then initiates the effects summarized above and the vessel proceeds to the desired depth. As the other representative voltages develop, the planesman readjusts, or backs-off on, the stern plane setting in such a manner that the pointer of display meter 28 remains at the intended depth. Thus, the planesman merely handles the depth changing operation as a simple "tracking" task, not anticipating in any way the meter movements of display meter 28, but simply manipulating stern plane control wheel 1 in such a way as to keep the meter indicator as close to the desired depth marker as possible.

There are two modes of control that may be employed in the depth keeping operation. The first is essentially the same as the depth changing operation since the planesman merely adjusts stern plane control wheel 1 to maintain the needle of display meter 28 at the desired depth. This adjusting or "tracking" to offset perturbations of the sea and the like will insure "trim" operation of the vessel at a constant depth since both a change in craft angle and depth are reflected on the display meter as a deviation from the desired indication. The second mode of control is used when greater accuracy and sensitivity is desired. This may be accomplished by throwing switch 30 in the upper position shown in FIG. 1, positioning variable resistor 32 to provide a voltage representative of a selected depth, and controlling display meter 29 to keep the needle on zero through the manipulation of stern plane control wheel 1. If even greater accuracy is desired, it may be obtained, in one manner, by providing the arrangement shown in FIG. 1 with a more sensitive display meter and/or adding network.

Referring to FIG. 3, a second embodiment of the present invention is disclosed showing a mobile unit control device that may be employed simultaneously by a stern planesman and bow planesman during the depth changing or depth keeping operation of a submarine. It will be noted that the structure shown in FIG. 3 is similar to the structure shown in FIG. 1. As in FIG. 1 stern plane control wheel 1 cooperates with hydraulic motor 2, pump and reservoir 2A, hydraulic repeater 5, selsyn repeater 7 to derive signals indicative of a stern plane control wheel displacement and stern plane angle. In a similar manner, bow plane control wheel 41, pump and reservoir 42, hydraulic repeater 43, selsyn system 44 and selsyn repeater 45 cooperate to derive signals indicative of bow plane control wheel displacement and bow plane angle. As in FIG. 1, pendulum 31 cooperates with variable resistor 18, resistor 21 and capacitor 22 to derive signals indicative of craft angle and rate of change of craft angle, respectively, and pressure mechanism 9 cooperates with variable resistor 25 to derive a signal indicative of craft depth. For a complete explanation of the cooperation between these elements reference is made to the description of FIG. 1 presented above.

The signals that are produced in dependency on bow control wheel displacement, bow plane angle, craft angle, rate of change of craft angle and craft depth are applied to adding network 46. Likewise the signals derived in dependency on stern control wheel displacement, stern plane angle, craft angle, rate of change of craft angle and craft depth are applied to adding network 47. It is, of course, understood that other types of adding circuits may be used in the arrangement shown in FIG. 3 and that the resulting signal may be applied to a variety of indicating devices, including a cathode ray tube indicating device.

Variable resistors 56 and 48 are connected across the direct current source of voltages 49 and 50, respectively, to provide keep reference voltages. The voltage on the center tap of variable resistor 48 is applied to bow control display meter 51 through single-pole, single-throw switch 52. Similarly, the voltage on the center tap of variable resistor 56 is applied to stern control display meter 53 through single-pole, single-throw switch 54 and double-pole, double-throw switch 55. Single-pole, single-throw switches 52 and 54 are ganged for convenience in operation.

Referring to FIG. 4, which is a flow chart of the structure shown in FIG. 3, the part of this figure within the dotted lines pertains to the hydrodynamic response of the submarine while the parts outside of the dotted lines pertain to the electrical signals derived from the hydrodynamic response. The process of integration is represented by integrators 60 through 64. It is noted that the bow plane control wheel displacement and stern plane control wheel displacement, variables of submarine operation, are integrated by integrator 60 and integrator 61, respectively, and the result is applied to adders 65 and 66. The output of adder 65 is appled to adder 67 while the output of adder 66 is applied to and integrated by integrator 62 to obtain the rate of change of craft angle which, in turn, is integrated by integrator 63 to obtain craft angle; and finally, the craft angle is integrated by integrator 64 to obtain craft depth. Signals representing stern plane control wheel displacemet, stern plane angle, rate of change of craft angle, craft angle, and craft depth are combined by adding networks 68 to 71 and the resulting signal is applied to double-pole, double-throw switch 72. Resistors 82a to 82e and resistors 83a to 83e correspond to the resistors in adding networks 46 and 47, respectively, in FIG. 3. A reference voltage derived from variable resistor 73 may also be applied to double-pole, double-throw switch 72 through single-pole, single-throw switch 74 and the algebraic sum of the two signals is applied to stern plane control display meter 75. In a similar manner, signals that represent bow plane control wheel displacement, bow plane displacement, rate of change of craft angle, craft angle, and craft depth are combined by adding networks 76 to 79 and the resulting signal is applied to bow control display meter 81. A reference voltage derived from variable resistor 80 may also be applied through single-pole, single-throw switch 82 to the bow control display so that the algebraic sum of the two signals will control the bow control display.

It is, of course, understood that the adding networks referred to above could be any conventional electrical or mechanical network that combines two or more signals to obtain a resultant signal.

The embodiment of the present invention shown in FIGS. 3 and 4 provides for the use of both stern and bow planes in the depth keeping and depth changing operation. In depth keeping and changing there are two modes of operation that may be used, namely, "forcing" and "planning." In the former both stern and bow planes are turned in the same direction whereas in the latter the stern plane is turned in one direction and the bow plane in the opposite direction. In "forcing," the craft is brought to a desired level by moving the craft more or less perpendicularly, like an elevator, whereas in "angling" or "planing" the craft is brought to a desired level at a predetermined boat angle. Thus, if it is necessary to change depth by five feet, the change can be accomplished by (1) an angular displacement of both planes in the same direction or (2) displacements in opposite directions. The first will "force" depth change of the hull, and the second will change depth by developing a craft angle. In one mode of the depth keeping operation utilizing the first method, double-pole, double-throw switch 72 in FIG. 4 is thrown to the lower position, and the bow planesman is instructed to maintain zero angle on the craft. Therefore, when the bow planesman displaces his plane to make a small depth adjustment, the stern planesman sees a craft angle beginning to develop. To prevent this he rotates his plane in the same direction that the bow plane was rotated and the hull is "forced" up or down without the development of any significant craft angle.

The depth reference voltage may be used when "angling" or "forcing" when it is desired to maintain the craft at a predetermined depth. For example, assume the craft is at a depth of 50 ft. and it is desired to maintain the craft at that depth by "angling." Double-pole, double-throw switch 72 in FIG. 4 is thrown to the upper position and ganged single-pole, single-throw switches 74 and 82 are thrown to the lower positions shown in FIG. 4. Variable resistors 73 and 80 are set at 50 ft. and a predetermined voltage is applied to stern control display meter 75 and bow control display 81 which are then operated as null-indicating meters.

Referring to FIG. 5, when the embodiment of the control circuit shown in this figure is utilized with the arrangement shown in FIG. 1, the signals that are representative of stern control wheel displacement, stern plane displacement, rate of change of craft angle and craft angle instead of being applied to adding network 27, as shown in FIG. 1, are applied to adding network 85. The signal representing depth is applied directly to display meter 86 through resistor 87. If the control circuit is to be used with the embodiment shown in FIG. 3, by minor and appropriate modifications the biased diode circuits are inserted between adding networks 46 and 47 and stern control display meter 53 and bow control display meter 51, respectively.

By way of example when the control circuit of FIG. 5 is employed with the embodiment of FIG. 1, the resulting signal obtained from adding network 85 is applied to display meter 86 through resistor 98 and also through resistor 95, diodes 88 or 89 (depending upon the polarity of the signal) and network 90.

Network 90 acts as a voltage limiter in that the output is the difference in magnitude between the voltage across either variable resistor 91 or 92 and the voltage applied to the network through either diode 88 or 89 from adding network 85. The output of network 90 is applied to display meter 86.

To explain the operation of the control circuit shown in FIG. 5, reference is made to FIGS. 6 and 7. Assume that bias A as shown in FIG. 6 is applied by variable resistors 91 and 92 to diodes 88 and 89. At time Z the bias voltage will be equal to the voltage supplied at point 97 in FIG. 5 by adding network 85. Now referring to FIG. 7, the current through display meter 86 due to the output of adding network 85 will increase along the slope C until time Z when the increased voltage applied to display meter 86 by network 90 will cause the current through the display meter to increase along slope d.

By varying the bias on diodes 88 and 89 it is possible to control the location of the break in the curve shown in FIG. 7. The position of the break will determine the length of time the stern and/or bow planes will act to develop craft angle and this in turn will determine in part the slope the craft will take in moving to the desired level.

Thus, embodiment of the control circuit may be used to determine the slope of glide from one level to another. When the planesman or operator desires a certain glideslope, he merely sets variable resistors 91 and 92 so that the resultant signal from adding network 85 must attain a predetermined value before display meter 86 indicates the level to which the craft is to be brought. It is apparent that depending upon the position of variable resistors 91 and 92, stern plane control wheel 1 and stern planes 4 in FIG. 1 must be displaced to a given position for a given length of time to permit the resultant signal to build up to the required magnitude. This, in turn, will determine the craft angle, and consequently, the slope of glide from one level to another. Hence, by merely adjusting variable resistors 91 and 92 the planesman can control the slope of the glide in bringing the craft from one level to another.

Various other modifications are contemplated and may obviously be resorted to by those skilled in the art without departing from the spirit and scope of the invention, as hereinafter defined by the appended claims, as only preferred embodiments thereof have been disclosed.

What is claimed is:

1. In a system for controlling a mobile unit, force exerting means for controlling direction of movement of said mobile unit in a selected plane, means for providing a first signal in dependency on displacement of said first mentioned means from a reference position, differentiating means for providing a second signal in dependency on rate of change of mobile unit angle, means for providing a third signal in dependency on mobile unit angle, means for combining the first signal, the second signal and the third signal to derive a resultant signal, an indicating device, and means for applying said resultant signal to said indicating device.

2. In a system for controlling a mobile unit, force exerting means for controlling direction of movement of said mobile unit in a selected plane, means for providing a signal in dependency on displacement of said first mentioned means from a first reference position, differentiating means for providing a second signal in dependency on rate of change of mobile unit angle, means for providing a third signal in dependency on mobile unit angle, means for providing a fourth signal in dependency on displacement of said mobile unit from a second reference position, means for combining the first signal, the second signal, the third signal and the fourth signal to derive a resultant signal, an indicating device, and means for applying the resultant signal to the indicating device.

3. In a system for controlling a mobile unit, force exerting means for controlling direction of movement of said mobile unit in a selected plane, means connected to said first mentioned means for controlling displacement of said first mentioned means, means for providing a first signal in dependency on the displacement of said first mentioned means from a first-reference position, means for providing a second signal in dependency on displacement of said second mentioned means from a second reference position, differentiating means for providing a third signal in dependency on rate of change of mobile unit angle, means for providing a fourth signal in dependency on mobile unit angle, means for combining the first signal, the second signal, the third signal and the fourth signal to derive a resultant signal, an indicating device and means for applying the resultant signal to the indicating device.

4. In a system for controlling a mobile unit, force exerting means for controlling direction of movement of said mobile unit, means for providing a first signal in dependency on displacement of said first mentioned means from a reference position, means for providing a second signal in dependency on mobile unit angle, differentiating means connected to said last mentioned means for differentiating said second signal to derive a third signal, means for combining the first signal, the second signal and the third signal to derive a resultant signal, an indicating device, and means for applying the resultant signal to the indicating device.

5. In a system for controlling a mobile unit, force exerting means for controlling the direction of movement of said mobile unit in a selected plane, control means connected to said first mentioned means for controlling displacement of said first mentioned means, means for providing a first signal in dependency on the displacement of said first mentioned means from a first reference position, means for providing a second signal in dependency on displacement of said control means from a second reference position, means for providing a third signal in dependency on mobile unit angle, differentiating means connected to said last mentioned means for differentiating said third signal to derive a fourth signal, means for providing a fifth signal in dependency on displacement of the mobile unit from a third reference position in said selected plane, means for combining the first signal, the second signal, the third signal, the fourth signal, and the fifth signal to derive a resultant signal, an indicating device, and means for applying the resultant signal to the indicating device.

6. In a system for controlling a mobile unit, force exerting means for controlling the direction of movement of said mobile unit in a selected plane, control means connected to said first mentioned means for controlling the displacement of said first mentioned means, means for providing a first signal in dependency on the displacement of said first mentioned means from a first reference position, means for providing a second signal in dependency on the displacement of said control means from a second reference position, means for providing a third signal in dependency on mobile unit angle, differentiating means connected to said last mentioned means for differentiating said third signal to derive a fourth signal, means for providing a fifth signal in dependency on the displacement of the mobile unit from a third reference position in said selected plane, means for combining the first signal, the second signal, the third signal, the fourth signal and the fifth signal to derive a resultant signal, an indicating device, means for applying said resultant signal to the indicating device, and means for applying a signal of predetermined magnitude and opposite polarity of the resultant signal to said indicating device.

7. In a system for controlling a mobile unit, first force exerting means for controlling the direction of movement of said mobile unit in a selected plane, second force exerting means for controlling the direction of movement of said mobile unit in the selected plane, said first force exerting means being independent of the second force exerting means, means for deriving a first signal in dependency on the magnitude of force exerted by said first force exerting means, means for deriving a second signal in dependency on the force exerted by said second force exerting means, differentiating means for deriving a third signal in dependency on the rate of change of mobile unit angle, means for deriving a fourth signal in dependency on mobile unit angle, means for combining the first signal, the third signal and the fourth signal to derive a first resultant signal, a first indicating device, means for applying said first resultant signal to the first indicating device, means for combining the second signal, the third signal and the fourth signal to derive a second resultant signal, a second indicating device, and means for applying the second resultant signal to the second indicating device.

8. In a system for controlling a mobile unit, first force exerting means for controlling the direction of movement of said mobile unit in a selected plane, first control means connected to said first force exerting means for controlling the magnitude of force exerted by said first force exerting means, second force exerting means for controlling the direction of movement of said mobile unit in the selected plane, said first force exerting means being independent of said second force exerting means, second control means connected to said second force exerting means for controlling the magnitude of the force exerted by said second force exerting means, means for deriving a first signal in dependency on the magnitude of force exerted by said first force exerting means, means for deriving a second signal in dependency on displacement of said first control means from a first reference position, means for deriving a third signal in dependency on the magnitude of the force exerted by said second force exerting means, means for deriving a fourth signal in dependency on displacement of said second control means from a second reference position, differentiating means for deriving a fifth signal in dependency on rate of change of mobile unit angle, means for deriving a sixth signal in dependency on mobile unit angle, means for combining the first signal, the second signal, the fifth signal, and the sixth signal to derive a first resultant signal, means for combining the third signal, the fourth signal, the fifth signal and the sixth signal to derive a second resultant signal, a first indicating device means for applying the first resultant signal to the first indicating device, a second indicating device, and means for applying said second resultant signal to the second indicating device.

9. In a system for controlling a mobile unit, first force exerting means for controlling the direction of movement of said mobile unit in a selected plane, second force exerting means for controlling the direction of said mobile unit in said selected plane, said first force exerting means being independent of said second force exerting means, first control means connected to said first force exerting means for controlling the magnitude of force exerted by said first force exerting means, second control means connected to said second force exerting means for controlling the magnitude of force exerted by said second force exerting means, means for providing a first signal in dependency on the magnitude of force exerted by said first force exerting means, means for deriving a second signal in dependency on displacement of said first control means from a first reference position, means for deriving a third signal in dependency on the magnitude of force exerted by said second force exerting means, means for deriving a fourth signal in dependency on displacement of said second control means from a second reference position, means for deriving a fifth signal in dependency on mobile unit angle, differentiating means connected to said last mentioned means for differentiating said fifth signal to provide a sixth signal, means for combining the first signal, the second signal, the fifth signal and the sixth signal to provide a first resultant signal, a first indicating device, means for applying the first resultant signal to the first indicating device, means for combining the third signal, the fourth signal, the fifth signal and the sixth signal for providing a second resultant signal, a second indicating device, and means for applying said second resultant signal to the second indicating device.

10. In a system for controlling a mobile unit, first force exerting means for controlling the direction of movement of said mobile unit in a selected plane, first control means connected to said first force exerting means for controlling the magnitude of force exerted by said first force exerting means, second force exerting means for controlling the direction of movement of said mobile unit in the selected plane, said first force exerting means being independent of said second force exerting means, second control means connected to said second force exerting means for controlling the magnitude of the force exerted by said second force exerting means, means for deriving a first signal in dependency on the magnitude of force exerted by said first force exerting means, means for deriving a second signal in dependency on displacement of said first control means from a first reference position, means for deriving a third signal in dependency on the magnitude of force exerted by said second force exerting means, means for deriving a fourth signal in dependency on displacement of said second control means from a second reference position, differentiating means for deriving a fifth signal in dependency on rate of change of mobile unit angle, means for deriving a sixth signal in dependency on mobile unit angle, means for deriving a seventh signal in dependency on displacement of said mobile unit from a third reference position in said selected plane, means for combining the first signal, the second signal, the fifth signal, the sixth signal and the seventh signal to derive a first resultant signal, a first indicating device, means for applying said first resultant signal to the first indicating device, means for combining the third signal, the fourth signal, the fifth signal, the sixth signal, and the seventh signal to derive a second resultant signal, a second indicating device, and means for applying the second resultant signal to the second indicating device.

11. In a system for controlling a mobile unit, first force exerting means for controlling the movement of said mobile unit in a selected plane, second force exerting means for controlling the movement of said mobile unit in the selected plane, said first force exerting means being independent of said second force exerting means, first control means for controlling the magnitude of said first force exerting means, second control means for controlling the magnitude of force exerted by said second force exerting means, means for deriving a first signal in dependency on the force exerted by said first force exerting means, means for deriving a second signal in dependency on displacement of the first force exerting means from a first reference position, means for deriving a third signal in dependency on the magnitude of force exerted by the second force exerting means, means for deriving a fourth signal in dependency on displacement of said second control means from a second reference position, means for deriving a fifth signal in dependency on mobile unit angle, differentiating means connected to said last mentioned means for differentiating said fifth signal to derive a sixth signal, means for providing a seventh signal in dependency on the displacement of said mobile unit from a third reference position, means for combining the first signal, the second signal, the fifth signal, the sixth signal, and the seventh signal to provide a first resultant signal, a first indicating device, means for applying the first resultant signal to the first indicating device, means for combining the third signal, the fourth signal, the fifth signal, the sixth signal and the seventh signal to provide a second resultant signal, a second indicating device, and means for applying the second resultant signal to the second indicating device.

12. In a system for controlling a mobile unit, first force exerting means for controlling the movement of said mobile unit in a selected plane, second force exerting means for controlling the movement of said mobile unit in the selected plane, said first force exerting means being independent of said second force exerting means, first control means for controlling the magnitude of force exerted by said first force exerting means, second control means for controlling the magnitude of force exerted by said second force exerting means, means for deriving a first signal in dependency on the force exerted by said first force exerting means, means for deriving a second signal in dependency on displacement of the first force exerting means from a first reference position, means for deriving a third signal in dependency on the magnitude of force exerted by the second force exerting means, means for deriving a fourth signal in dependency on displacement of said second control means from a second reference position, means for deriving a fifth signal in dependency on mobile unit angle, differentiating means connected to said last mentioned means for differentiating said fifth signal to provide a sixth signal, means for providing a seventh signal in dependency on the displacement of said mobile unit from a third reference position, means for combining the first signal, the second signal, the fifth signal, the sixth signal, and the seventh signal to provide a first resultant signal, means for providing an eithth signal of predetermined magnitude and opposite in polarity to said first resultant signal, a first indicating device, means for applying said first resultant signal to said first indicating device, means for applying said eighth signal to said first indicating device, means for combining the third signal, the fourth signal, the fifth signal, the sixth signal and the seventh signal to provide a second resultant signal, means for providing a ninth signal of predetermined magnitude and opposite in polarity to said second resultant signal, a second indicating device, means for applying said second resultant signal to the second indicating device, and means for applying said ninth signal to said second indicating device.

13. In a system for controlling a mobile unit, force exerting means for controlling the direction of movement of said mobile unit in a selected plane, means for providing a first signal in dependency on displacement of said first mentioned means from a reference position, differentiating means for providing a second signal in dependency on the rate of change of mobile unit angle, means for providing a third signal in dependency on mobile unit angle, means for combining the first signal, the second signal and the third signal to derive a first resultant signal, differencing means for providing a second resultant signal having a magnitude dependent upon the difference in magnitude between an input signal and a control signal applied thereto when said input signal and said control signal have the same polarity and the magnitude of said input signal exceeds the magnitude of the control signal, said second resultant signal having the same polarity as said input signal, a source of energy providing a control signal, means for applying said control signal to said differencing means, means for applying said first resultant signal to said differencing means as an input signal, an indicating device, and means for applying said first resultant signal and said second resultant signal to the indicating device.

14. In a system for controlling a mobile unit, force exerting means for controlling the direction of movement of said mobile unit in a selected plane, means for providing a first signal in dependency on displacement of said first mentioned means from a first reference position, differentiating means for providing a second signal in dependency on rate of change of mobile unit angle, means for providing a third signal in dependency on mobile unit angle, means for providing a fourth signal in dependency on displacement of said mobile unit from a second reference position in said selected plane, means for combining the first signal, the at least a first differencing means and a second differencing means, each providing a second resultant signal dependent upon the difference in magnitude between an input signal and a control signal applied thereto when said input signal and said control signal have the same polarity and the magnitude of said input signal exceeds the magnitude of the control signal, said second resultant signal having the same polarity as said input signal, means connecting said first differencing means and said second differencing means in push-pull relationship, a source of energy providing a first control signal and a second control signal, means for applying said first control signal and said second control signal to the first differencing means and the second differencing means, respectively, means for applying said first resultant signal to said first differencing means and said second differencing means as an input signal, an indicating device, and means for applying said fourth signal, said first resultant signal and said second resultant signal to the indicating device.

15. In a system for controlling a mobile unit, means for exerting a force for controlling the direction of movement of said mobile unit in a selected plane, means connected to said first mentioned means for controlling displacement of said first mentioned means, means for providing a first signal in dependency on the displacement of said first mentioned means from a first reference position, means for providing a second signal in dependency on displacement of said second mentioned means from a second reference position, differentiating means for providing a third signal in dependency on rate of change of mobile unit angle, means for providing a fourth signal in dependency on mobile unit angle, means for combining the first signal, the second signal, the third signal and the fourth signal to derive a first resultant signal, at least a first differencing means and a second differencing means, each providing a second resultant signal having a magnitude dependent upon the difference in magnitude between an input signal and a control signal applied thereto when said input signal and said control signal have the same polarity and the magnitude of said input signal exceeds the magnitude of the control signal, said second resultant signal having the same polarity as said input signal, means connecting said first differencing means and said second differencing means in push-pull relationship, a source of energy providing a first control signal and a second control signal, means for applying said first control signal and said second control signal to the first differencing means and the second differencing means, respectively, means for applying said first resultant signal to said first differencing means and said second differencing means as an input signal, an indicating device, and means for applying said first resultant signal and said second resultant signal to the indicating device.

References Cited in the file of this patent

UNITED STATES PATENTS

| Number | Name | Date |
| --- | --- | --- |
| 2,398,421 | Frische | Apr. 16, 1946 |
| 2,548,278 | Wrikler | Apr. 10, 1951 |
| 2,613,352 | Kellogg | Oct. 7, 1952 |
| 2,638,288 | Hanna | May 12, 1953 |
| 2,755,426 | Kutzler | July 17, 1956 |
| 2,773,382 | Rand | Dec. 11, 1956 |
| 2,790,946 | Yates | Apr. 30, 1957 |
| 2,845,623 | Iddings | July 29, 1958 |
| 2,863,622 | Ciscel | Dec. 9, 1958 |
| 2,896,145 | Snodgrass | July 21, 1959 |
| 2,969,033 | Vacquier | Jan. 24, 1961 |